United States Patent [19]

Nagy et al.

[11] Patent Number: 4,720,222

[45] Date of Patent: Jan. 19, 1988

[54] RESTRAINING BAR FOR PICKUP TRUCKS

[76] Inventors: Neil F. Nagy, 1310 Park Western Dr., #159, San Pedro, Calif. 90731; William Palleva, 18014 S. Laurelbrook Pl., Cerritos, Calif. 90701

[21] Appl. No.: 894,935

[22] Filed: Aug. 8, 1986

[51] Int. Cl.[4] .............................................. B60P 7/14
[52] U.S. Cl. .................................... 410/151; 403/167; 410/145
[58] Field of Search ............... 410/143, 151, 149, 145, 410/144, 150, 128, 129; 403/167, 168; 254/16, 15, 133 A; 405/272, 282

[56] References Cited

U.S. PATENT DOCUMENTS

| | | | |
|---|---|---|---|
| 1,851,489 | 3/1932 | Brook | 254/16 |
| 2,974,931 | 3/1961 | Reel et al. | 410/151 |
| 3,049,328 | 8/1962 | Bishop | 410/151 |
| 3,090,600 | 5/1963 | Smith | 410/151 |
| 3,110,506 | 11/1963 | O'Brien | 410/151 |
| 3,995,565 | 12/1976 | Kersey | 410/151 |
| 4,473,331 | 12/1984 | Wisecarver | 410/151 |

*Primary Examiner*—David A. Scherbel
*Assistant Examiner*—Donald T. Hajec
*Attorney, Agent, or Firm*—Blakely, Sokoloff, Taylor & Zafman

[57] ABSTRACT

A restraining bar for use on pickup trucks and the like for clamping between the two sidewalls of the truck bed to restrain articles which otherwise would tend to drift around and/or fall over if not adequately retained. The restraining bar is comprised of first and second telescoping members, each having a friction pad at the distal end thereof for being forced against and frictionally retained by respective sidewalls of a pickup truck bed. Connected to the inner end of the smaller member of the telescoping pair is a spring member operable by an operating lever which, when in an upper or spring uncompressed position, is free to slide within the larger of the two telescoping members, though when pushed downward toward a spring compressed position will first engage and lock against interior opposing walls of the larger of the two telescopic members, and thereafter compress the spring, ultimately reaching an over center position to be self retaining. Accurately telescoping members, together with the simple engaging lever, allows the convenient use of the restraining bar on trucks ranging from the mini pickup trucks to full size pickup trucks without requiring any hardware changes.

14 Claims, 7 Drawing Figures

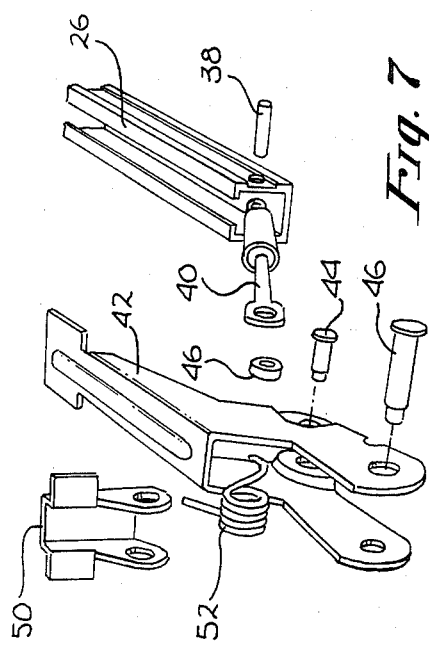
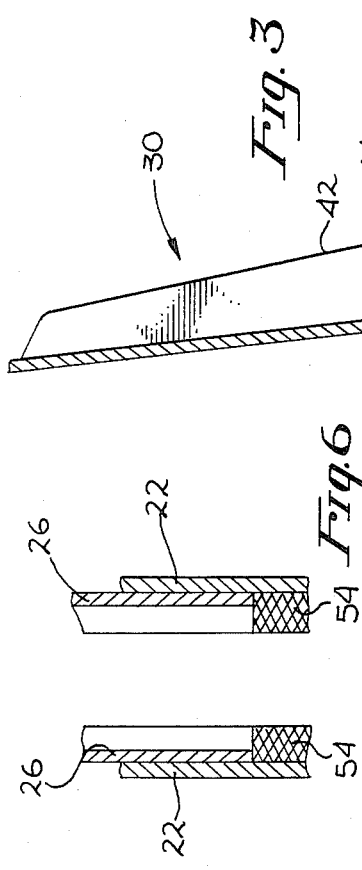
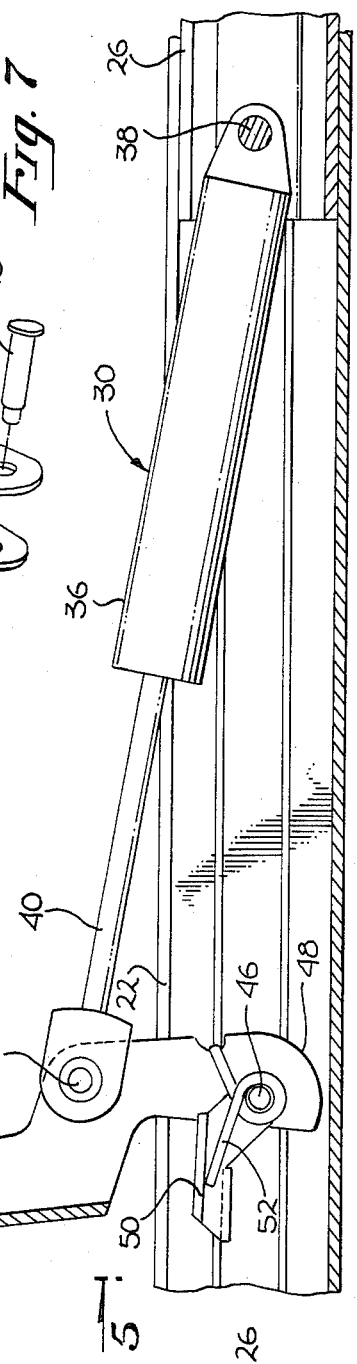
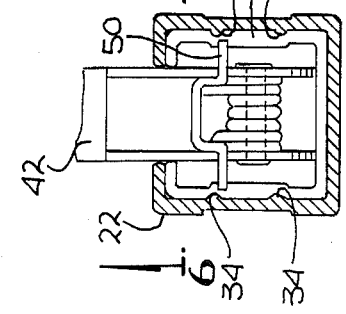
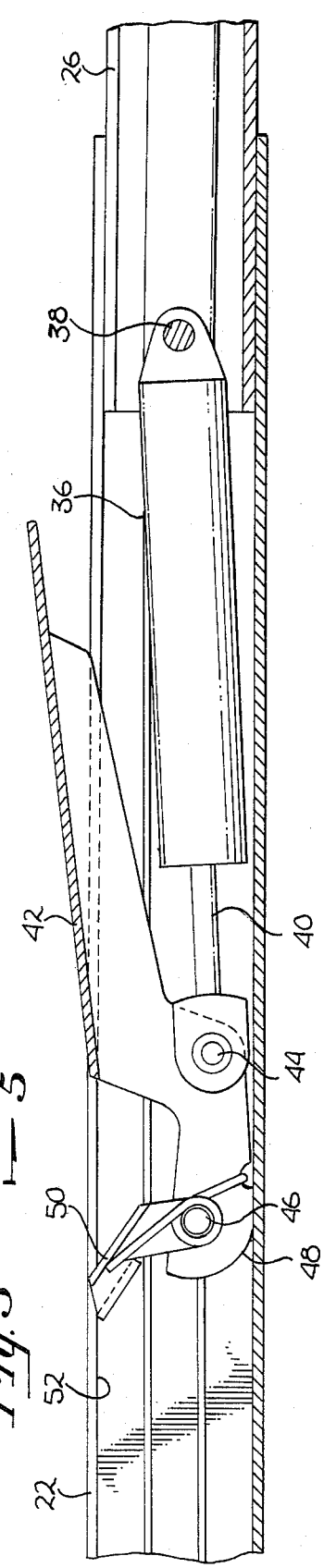

RESTRAINING BAR FOR PICKUP TRUCKS

BACKGROUND OF THE INVENTION

1. Field of the Invention

The present invention relates to the field of retension devices for pickup trucks and the like.

2. Prior Art.

Pick up trucks ranging in size from the mini pickups to full size pickups are currently very popular, the same being relatively low cost, generally available in four wheel drive versions and convenient for camping, hauling and trailer towing. Very frequently however, such vehicles are used for everyday family purposes such as shopping and the like, wherein a few shopping bags, etc. are to be carried. In an ordinary automobile such articles could be readily carried in the back seat and/or in the trunk, though in pickup trucks, particularly with more than one passenger, there is inadequate space for such articles in the cab. Carrying the articles on the truck bed itself, however, invites the articles to slide around, tip over, etc. unless somehow adequately restrained. While means such as tie lines, etc. can be used, they are in general inconvenient to rig, and frequently the cleats or other convenient tie points are too high for appropriate use. Thus one of the objects of the present invention is to provide a restraining bar which may be easily placed wherever desired between the sides of a pickup bed and which, when locked in place, will have an appropriate elevation for proper restraint of typical articles to be carried. It is also an object of the present invention to provide such a restraining bar which will be self adapting and perform equally as well on larger pickups as well as small pickups, vans and trailers without requiring any changes thereto, disassembly and reassembly thereof, etc.

BRIEF SUMMARY OF THE INVENTON

A restraining bar for use on pickup trucks and the like for clamping between the two sidewalls of the truck bed to restrain articles which otherwise would tend to drift around and/or fall over if not adequately retained. The restraining bar is comprised of first and second telescoping members, each having a friction pad at the distal end thereof for being forced against and frictionally retained by respective sidewalls of a pickup truck bed. Connected to the inner end of the smaller member of the telescoping pair is a spring member operable by an operating lever which, when in an upper or spring uncompressed position, is free to slide within the larger of the two telescoping members, though when pushed downward toward a spring compressed position will first engage and lock against interior opposing walls of the larger of the two telescopic members, and thereafter compress the spring, ultimately reaching an over center position to be self retaining. Accurately telescoping members, together with the simple engaging lever, allows the convenient use of the restraining bar on trucks ranging from the mini pickup trucks to full size pickup trucks without requiring any hardware changes.

BRIEF DESCRIPTION OF THE DRAWINGS

FIG. 3 is a partial cross section taken longitudinally through the bar illustrating the locking system in the unlocked position.

FIG. 4 is a partial cross section similar to that of FIG. 3, but with the control lever in the locked position.

FIG. 5 is a cross section taken along line 5—5 of FIG. 3.

FIG. 6 is a cross section taken along line 6—6 of FIG. 5.

FIG. 7 is an exploded view of the control lever and spring assemblies of the present invention.

DETAILED DESCRIPTION OF THE INVENTION

Figure 1:
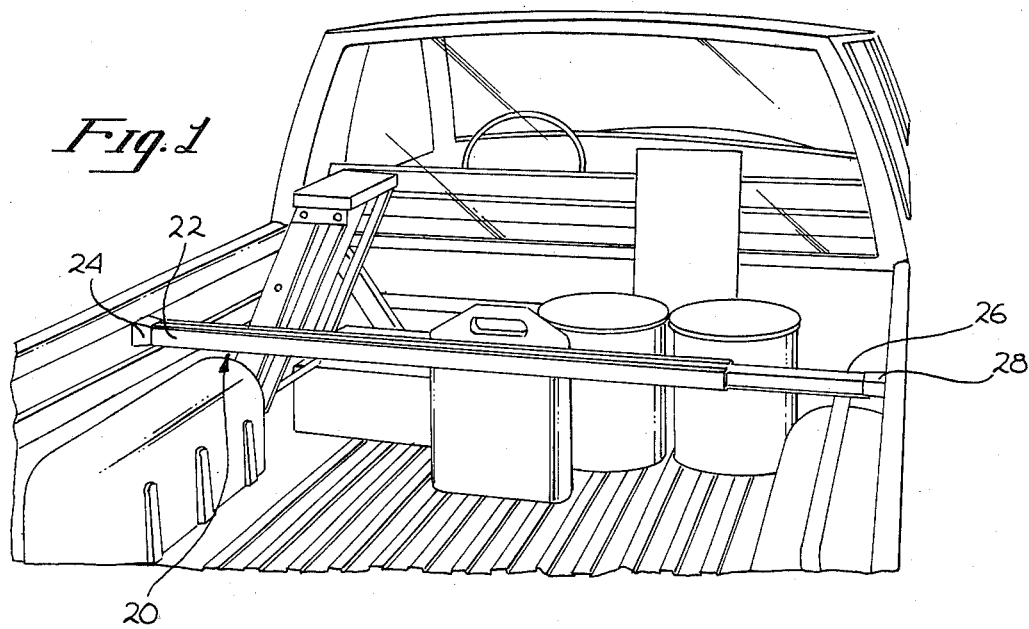
FIG. 1 is a perspective view of a pickup truck with the present invention restraining bar mounted therein.

First referring to FIG. 1, a perspective view of a typical pickup truck with a restraining bar, generally indicated by the numeral 20, in accordance with the present invention may be seen. As shown, the restraining bar is positioned laterally across the width of the pickup truck with the ends thereof engaging the sides of the truck substantially below the top of the siderails so as to be conveniently positioned to restrain the various articles between the restraining bar and the front of the truck bed. The restraining bar 20 as shown is generally comprised of a first bar 22 having an elastomeric foot 24 thereon for frictionally engaging the side of the truck under pressure, without slippage and without damage to the paint, etc. Fitting within the first bar 22 is a second bar 26 also having an elastomeric foot 28 thereon for similarly engaging the opposite sidewall of the truck body. When the bar is locked in position as shown in FIG. 1, it is substantially free of protrusions, projections and the like, and may generally be used to restrain grocery bags, water cans and the like without requiring any special protection therefor and without any likelihood of tearing or puncturing of the same.

Figure 2:
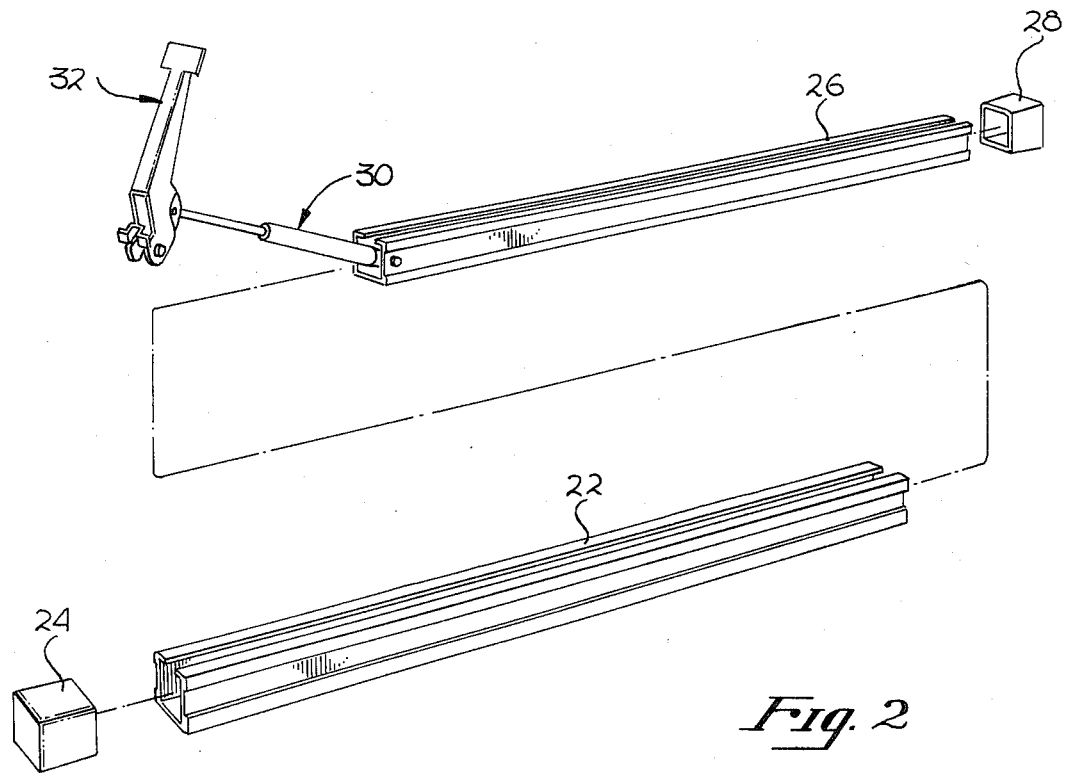
FIG. 2 is an exploded perspective view of the restraining bar of FIG. 1.

Now referring to FIG. 2, the restraining bar 20 of FIG. 1 may be seen in an exploded view. The feet 24 and 28 are proportioned to be a tight slip fit in bars 22 and 26, respectively. As may be seen in FIG. 2, the ends of the feet are patterned so that any moisture, oil or other liquid which might possibly be thereon or on the sidewalls of the pickup will essentially immediately be forced out of the small regions of actual contact, thereby minimizing the possibility of slippage once the restraining bar is locked in place. Also visible in FIG. 2 is a spring assembly generally indicated by the numeral 30, and control lever assembly generally indicated by the numeral 32, the construction and function of which will be subsequently described.

Now referring to FIG. 5, a cross section showing the section of bars 22 and 26 may be seen. Each of the two bars has a section which is approximately square, with one of the faces of the square having an opening or slot therein comprising a substantial fraction of that face. The larger bar 22 has inwardly extending projections 34 on the oppositely disposed inner sidewalls thereof, with those projections having a loose sliding fit in corresponding depressions in the adjacent outer walls of the inner bar 26. Aside from these sliding regions, the remaining surfaces of the inner bar generally have a greater clearance with the adjacent surfaces of the outer bar so that the sliding contact between the two bars is in general confined to the region of the protrusions and depressions, so that wear marks, etc. will be confined to the appropriate local region.

The spring assembly 30 and lever assembly 32 maybe seen in detail in the cross section of FIG. 3, the exploded perspective of FIG. 7 and of course in the perspective of FIG. 2. The spring assembly is comprised of a cylinder 36 supported on a pin 38 through the inner end of bar 26, and a push rod 40 supported from the lever 42 on pin 44. As perhaps best illustrated in FIG. 7, the lever 42 is of formed sheet metal having a U shaped section in the region of pin 44 so that the pin may pass through one side of the lever 42, the eye in push rod 40, through a spacer 46 and then the other side of the lever 42. The pin 44 itself is a rivet-like pin having a head on one end and a hollow extension on the remote end which, after assembly, is relatively easily flared for permanent attachment of the parts. The lever 42 is also formed for receipt of a similar type pin 46 adjacent its inner end, with its inner end region 48 formed in an arc substantially concentric to the pin 46. Supported on the pin is a cam or latch member 50 spring loaded with respect to the lever or handle 42 by spring 52.

The free state of the spring 52 is as illustrated in FIG. 3, namely that when lever 42 is lifted to a position approximately perpendicular to the axis of bars 22 and 26, the spring allows the latch 50 to freely longitudinally slide within the outer bar 22. In that regard, it will be noted from FIG. 5 that the latch 50 is wider than the inner bar 26, though of course is located beyond the end of the inner bar and need not fit therewithin. When the assembly is held in the desired position in a pickup truck with the ends of the restraining bar extended to engage the sides thereof, lever 42 is then rotated in the direction of the arrow shown in FIG. 3. In general, the initial rotation of the lever will be about pin 44, as latch 50 and end 48 of the lever 42 are free to move longitudinally in bar 22. However, as rotation of the lever continues, latch 50 will swing upward to the position illustrated in FIG. 4, engaging the inner surface 52 of bar 22 at a sufficiently steep angle to resist sliding longitudinally with respect thereto, whereby the combination of latch 50 and the inner end of lever 42 will be wedged or jammed between the under surfaces of the slotted side of bar 22 and the inner surface of the opposite wall thereof. This will occur during the initial rotation of lever 42, with further rotation resulting in the lever rotating about pin 46, compressing the spring assembly 30 to yieldably force the ends of the assembly into firm engagement with the sides of the pickup. When the lever 42 reaches its final locked position as shown in FIG. 4, it will be noted that pin 44 supporting the spring assembly from the lever has proceeded to a position below a line through pin 46 and pin 38, thereby locking the lever in that position by the spring compression and the resulting over center condition. As a precaution against the inadvertent slippage of latch 50, the inner surfaces 54 of the slot in rail 22 (FIG. 6) are knurled to provide mechanical grasping of the latch as well as frictional grasping thereof.

In the preferred embodiment the spring assembly 30 is an air spring characterized by a lubricated and well sealed piston connected to rod 40 operating within cylinder 36 against pressurized air sealed therein. Obviously however, other types of spring assemblies such as coil spring assemblies and the like may readily be used if desired.

There has been described herein a new and unique restraining bar for use with pickups of substantially all sizes which may be easily and quickly clamped between opposite walls of the truck bed to restrain articles not otherwise filling the full bed. The restraining bar may be adjusted to any length within its full range of adjustment without requiring any disassembly or detachment of parts, and is substantially self locking at any extension length merely by the actuation of a single control lever or handle. Obviously, while the preferred embodiment of the present invention has been disclosed and described herein with respect to a preferred embodiment thereof, it will be understood by those skilled in the art that various changes in form and detail may be made therein without departing from the spirit and scope of the invention.

I claim:

1. A restraining bar assembly comprising:
   a first elongate bar having a first end for abutting a first surface, and a second end, said first bar having a longitudinal slot therein;
   a second elongate bar having a first end for abutting a second surface, and a second end for sliding within said second end of said first bar;
   a spring assembly means for biasing said first end of said first bar towards said first surface and said first end of said second bar towards said second surface, said spring assembly means comprising:
   a lever means having a first end slidably mounted in said longitudinal slot of said first bar and rotatable between an unlocked position in which said first end of said lever means is freely slidable in said longitudinal slot and a locked position in which said first end of said lever means is held in a fixed position within said longitudinal slot;
   a first spring means having a first end coupled to said second end of said second bar and a second end coupled to said lever means, said first string means movable by said lever means from a free position in which said first and second ends of said first spring means have a first relative separation to a spring loaded position in which said first and second ends of said first spring means have a second relative separation, such that rotating said lever means from said unlocked to said locked position moves said first spring means from said free position to said spring loaded position;
   whereby as said lever mean is rotated to said locked position said first end of said first bar is biased by said first spring means towards said first surface and said first end of said second bar is biased by said first spring means towards said second surface.

2. The restraining bar of claim 1 wherein said lever means, when in said locked position, is encouraged by said said first spring means to rotate away from said unlocked position, whereby said lever means is held in said locked position by said first spring means.

3. The restraining bar of claim 1 wherein said lever means includes a locking means rotatably supported adjacent said first end of said lever means, and a second spring means acting between said first end of said lever means and said locking means, said locking means being freely slidable within said first bar when said lever means is in said unlocked position, said locking means rotating with said lever means to engage and lock against an inside surface of said first bar under the influence of said second spring means as said lever means is initially rotated from said unlocked position toward said locked position.

4. The restraining bar of claim 3 wherein the inside surface of said first bar to be engaged by said locking means is a rough surface.

5. The restraining bar of claim 1 wherein said first and second bars are extruded bars, each of a substantially uniform cross section.

6. The restraining bar of claim 5 wherein said first and second bars have cooperatively disposed extruded regions for contact therebetween when said second bar slides within said first bar.

7. The restraining bar of claim 1 wherein said first spring means is an air spring, said second relative separation of said first and second ends of said first spring means being less than said first relative separation.

8. The restraining bar of claim 1 wherein said lever means is approximately parallel to said first and second bars when in said locked position.

9. The restraining bar of claim 1 wherein said first ends of said first and second bars have friction pads thereon, said friction pads having a patterned outer surface thereon for reducing the area of actual contract with an adjacent surface.

10. A restraining bar assembly comprising:
   a first elongate bar having a first end for abutting a first surface, and a second end, said first bar having a longitudinal slot therein;
   a second elongate bar having a first end for abutting a second surface, and a second end for sliding within said second end of said first bar;
   a spring assembly means for biasing said first end of said first bar towards said first surface and said first end of said second bar towards said second surface, said spring assembly means comprising:
   a lever means having a first end slidably mounted in said longitudinal slot of said first bar and rotatable between an unlocked position in which said first end of said lever means is freely slidable in said longitudinal slot and a locked position in which said first end of said lever means is held in a fixed position within said longitudinal slot;
   a first spring means having a first end coupled to said second end of said second bar and a second end coupled to said lever means, said first spring means movable by said lever means from a free position in which said first and second ends of said first spring means have a first relative separation to a spring loaded position in which said first and second ends of said first spring means have a second relative separation, such that rotating said lever means from said unlocked to said locked position moves said first spring means from said free position to said spring loaded position;
   said lever means, when in said locked position being encouraged by said first spring means to rotate away from said unlocked position, whereby said lever means is held in said locked position by said first spring means, said lever means including a locking means rotatably supported adjacent said first end of said lever means, and a second spring means acting between said first end of said lever means and said locking means, said locking means being freely slidable within said first bar when said lever means is said unlocked position and rotating with said lever means to engage and lock against an inside surface of said first bar under the influence of said second spring means as said lever means is initially rotated toward said locked position;
   whereby as said lever means is rotated to said locked position said first end of said first bar is biased by said first spring means towards said first surface and said first end of said second bar is biased by said first spring means towards said second surface.

11. The restraining bar of claim 10 wherein the inside surface of said first bar to be engaged by said locking means is a rough surface.

12. The restraining bar of claim 10 wherein said first and second bars have cooperatively disposed extruded regions for contact therebetween when said second bar slides within said first bar.

13. The restraining bar of claim 10 wherein said first spring means is an air spring, said second relative separation of said first and second ends of said first spring means being less than said first relative separation.

14. The restraining bar of claim 13 wherein said lever means is approximately parallel to said first and second bars when in said locked position.

* * * * *